United States Patent [19]

Mange

[11] 4,222,288
[45] Sep. 16, 1980

[54] SUMMING GEAR ASSEMBLY, PARTICULARLY FOR SHIP DRIVES

[75] Inventor: Johannes Mange, Hamburg, Fed. Rep. of Germany

[73] Assignee: Blohm & Voss AG, Hamburg, Fed. Rep. of Germany

[21] Appl. No.: 867,943

[22] Filed: Jan. 9, 1978

[30] Foreign Application Priority Data

Jan. 7, 1977 [DE] Fed. Rep. of Germany ....... 2700459

[51] Int. Cl.³ .............................................. F16H 37/06
[52] U.S. Cl. ................................ 74/665 B; 74/421 R
[58] Field of Search ................. 74/414, 421 R, 665 P, 74/665 B

[56] References Cited

U.S. PATENT DOCUMENTS

| | | | |
|---|---|---|---|
| 3,690,196 | 9/1972 | Bilton | 74/665 BX |
| 3,881,444 | 5/1975 | Sigg | 74/665 P |
| 4,056,018 | 11/1977 | Chung | 74/665 P |
| 4,070,923 | 1/1978 | Benthake | 74/665 P |

FOREIGN PATENT DOCUMENTS 883639 12/1961 United Kingdom ................... 74/665 P

*Primary Examiner*—Albert J. Makay
*Assistant Examiner*—William E. Tapolcai, Jr.
*Attorney, Agent, or Firm*—Toren, McGeady and Stanger

[57] ABSTRACT

In a summing gear assembly, driving power is transmitted from a power source having several outputs, such as a steam turbine unit including a high pressure turbine, an intermediate pressure turbine, and a low pressure turbine, through input pinions and power drive lines to a common power take-off gear. Each input pinion is connected to a separate power output and is in meshed engagement with two adjacent power drive lines, there is one more power drive line than there are input pinions. The power drive lines are disposed in parallel laterally spaced relation and each has an intermediate pinion engaged with the power take-off gear.

4 Claims, 13 Drawing Figures

SUMMING GEAR ASSEMBLY, PARTICULARLY FOR SHIP DRIVES

Summing gear assemblies combine a plurality of drives to a common drive, for example, in a ship drive having a high-pressure, an intermediate-pressure and a low-pressure turbine.

Gear assemblies of this kind may be connected at the driving side also with other driving machines, for example, gas turbines or internal combustion engines, and on the power take-off side with machines of all kinds, and may be constructed as stepdown or stepup gear assemblies.

It is known that the stepdown gear assembly belonging to the main driving unit for ships has the purpose to reduce the rates of rotation of the drive sets which are too high to such rates of rotation of the propeller that the propeller reaches a best possible efficiency. Particularly in main driving units operating with steam turbines essentially two constructions have prevailed as stepdown gear assemblies for the purpose mentioned herein. On the one hand, there are those gear assemblies in which the driving power is transmitted to a first step. This first step consists of one pinion each and of gears meshing this pinion. These gears transmit the torque to a greater gear through another pinion which serves as a second step. The greater gear is connected to the propeller shaft. (This kind of gear assembly is also called "articulated", see FIGS. 1a and 1b.)

On the other hand, there are known gear assemblies such as in accordance with FIG. 1b which are mainly used for high driving powers and when the available space is narrow. In each power drive line the input pinions of the first step driven at the rate of rotation of the driving machine mesh with two stepdown gears each. On the shaft of each of the stepdown gears there is mounted another intermediate pinion which is force-positively connected to the greater gear (see FIGS. 1c and 1d). The advantages of this kind of gear assembly which is also called "locked-train" resides, aside from the advantages already mentioned above, particularly in the fact that the pinions of the first step, due to their two-fold engagement in the corresponding gears, transmit tooth pressures which are only half as high and are not subjected to bending but only to torsional stresses, the torque being equal. While the dimensions are equal per se, these gear assemblies, compared to the construction mentioned first, can be subjected to a power which is twice as high. However, in these summing gear assemblies the individual power drive lines are not connected to each other on the driving side so that it is not possible to have control over a uniform power distribution, particularly regarding an optimum design and utilization of the gear assembly. For example, a plurality of various structural parts must be provided for and these structural parts must each be constructed in accordance with different drawings. This means that a great number of spare parts is required which must be continuously kept in storage, together with the space required for this purpose and the costs arising as a result. However, the power take-off gear as the greater gear must always be designed in accordance with the larger power of the two power inputs. Accordingly, if, for example, the power of one driving pinion is twice as high as the power of the other pinion, then the width of the teeth of the greater gear is computed in accordance with the power of the larger power input, while it would only have to be half as wide if computed in accordance with the smaller input. Thus, the weight of the greater wheel doubles. This fact is expressed in a somewhat simplified manner; however, such a difference in power naturally influences all dimensions of the gear assembly and, therefore, also the weight, the price, the efficiency, the oil requirement, the foundation and the space requirement in the ship or at the construction site. A driving unit has an optimum efficiency especially if, for example, in the case of a steam turbine unit, it is divided into three partial turbines, to wit, a high-pressure, an intermediate-pressure and, finally, a low-pressure turbine. The power of these three partial turbines is approximately distributed in such a manner that the high-pressure and the intermediate-pressure turbine each produce thirty percent and the low-pressure turbine approximately forty percent of the power.

The invention is based on the task to achieve a power distribution as uniform as possible onto the individual power drive lines.

The inventive solution leads, while all previous advantages are maintained, to a manner of construction ("improved locked-train-construction") which requires at least one stepdown gear less in the first step. The different power of the driving machines or of the input pinions respectively is uniformly distributed over the gear assembly and, thus, onto the power take-off gear since the individual power drive lines no longer have a separate character. In the case of three power inputs the dimensions of the gear assembly do not change compared to the known "locked-train" construction having two power inputs, as far as in both cases the same total power is provided for. Accordingly, aside from eliminating two gears of the first step as well as two pinions of the second step and the two corresponding connecting shafts including two elastic couplings, torsion rods, etc. and the elimination of eight supporting bearings, the gear assembly has the same efficiency as a gear assembly of equal construction having only two power inputs. But also the gear assembly housing, by the elimination of two bores whose location is exactly determined and of supporting frames for the appropriate bearings, etc., is not more complicated than a gear assembly housing having two power inputs.

Due to the multiple power distribution in a gear assembly having three power inputs, there is also the possibility to obtain a smaller type of gear assembly since the input pinions have smaller diameters. This affects all other gears so that, finally, also the greater gear is narrower and has a smaller diameter.

In addition, such a described gear assembly having three power inputs is not only able to improve the total efficiency of the entire unit. This is so because of the reduction of the number of gears, shafts and bearings and, on the other hand, because of the possibility of an optimum design of the partial turbines. As it is known, the constructional length of the entire unit with regard to the storage capacity of a cargo ship, represents a factor which is not to be underestimated. By using a "locked-train" gear assembly having three power inputs according to the invention an extremely short driving unit in compact construction requiring relatively little space is created.

Even if the intermediate shafts are not constructed as torsion shafts in accordance with another embodiment of the invention, a better power distribution is obtained. Therefore, the construction of the intermediate shafts as torsion shafts is known (magazine "The Marine Engineer"). It is also known (DT-AS 11 58 786) to arrange the input pinions, if possible, in one plane.

It is especially advantageous to adjust the power of the individual driving machines in such a manner that the power input of the intermediate shafts is as equal as possible. Thus, the stresses on the teeth of the greater gear from the intermediate pinions of the second step become more uniform and the dimensions of the teeth become smaller and, accordingly, the greater gear becomes lighter.

The invention is shown in the drawing with the aid of some examples.

DETAILED DESCRIPTION OF THE INVENTION

The FIGS. 1f to 1i show various types of gear assemblies having two to five input pinions. The construction of these gear assemblies is principally the same as the one described in the following with the aid of FIGS. 2 and 3.

Figure 1A:
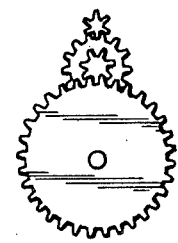
FIGS. 1a to 1i show diagrammatic representations of cross sections of various kinds of gear assemblies, of these gear assemblies the arrangements "a" to "e" show the state of the art and the arrangements "f" to "i" types of gear assemblies in accordance with the invention.
Figure 1B:
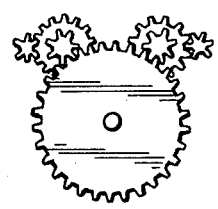
Figure 1C:
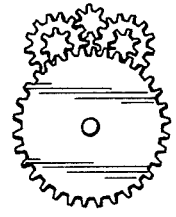
Figure 1D:
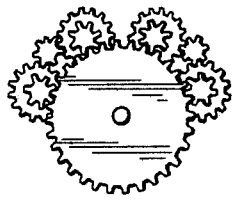
Figure 1E:
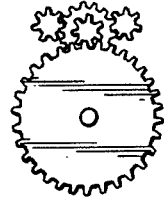
Figure 1F:
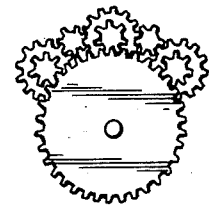
Figure 1G:
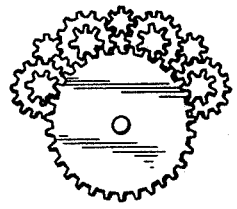
Figure 1H:
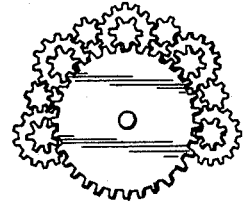
Figure 1I:
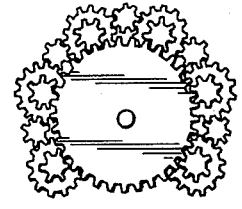
Figure 2:
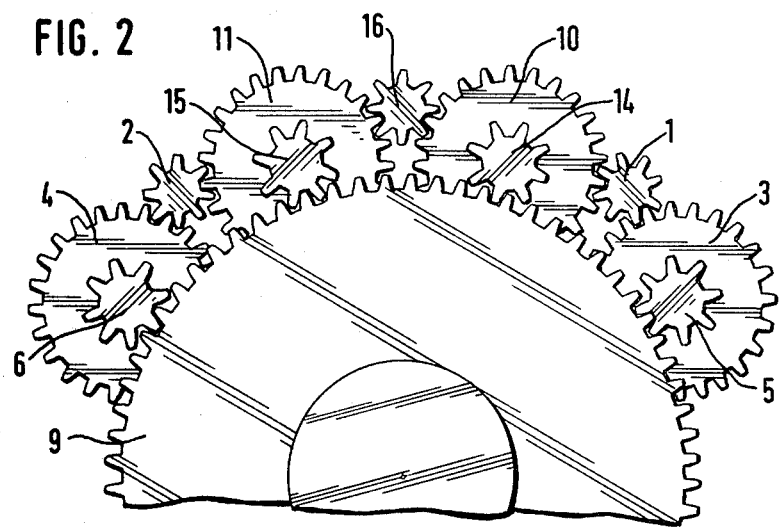
FIG. 2 shows a cross section in accordance with FIG. 1g, in an enlarged scale.
Figure 3:
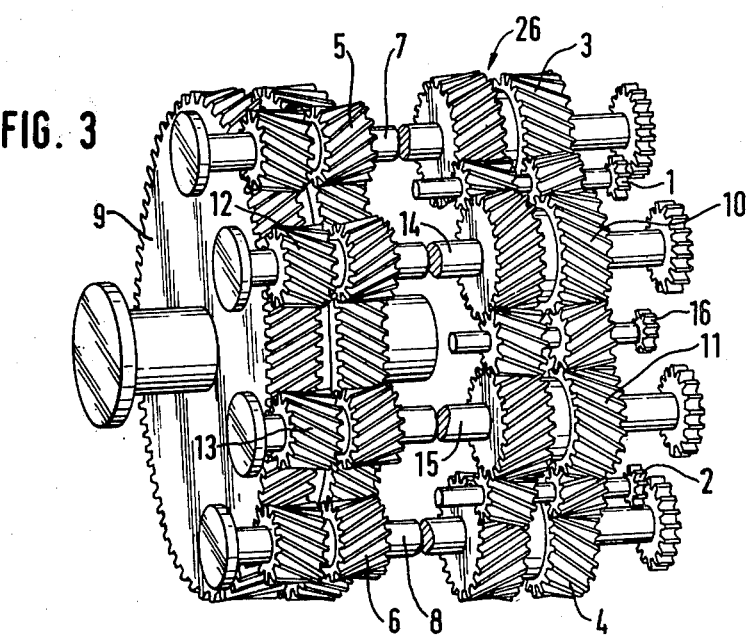
FIG. 3 shows a perspective view of a gear assembly without housing in accordance with FIG. 2 for the turbine drive.

In FIGS. 2 and 3 the first step of the stepdown gear assembly is represented by the three power inputs, for example, coming from the high-pressure, intermediate-pressure and low-pressure turbines, namely by the input pinions 1, 2 and 16 and by the stepdown gears 3, 4, 10 and 11 meshing with the input pinions 1, 2 and 16.

The stepdown gears 3, 4, 10 and 11 are coaxially connected to one additional pinion each, the intermediate pinions 5,6,12 and 13, through intermediate shafts 7,8,14 and 15.

The intermediate pinions 5,6, 12 and 13 mesh with a greater gear 9 which is the power take-off gear. This power take-off gear and the intermediate pinions 5,6, 12 and 13 represent the second step of the gear assembly. The line shafting or the propeller shaft (not shown) respectively are flanged to the greater gear 9 in a manner known per se.

Figure 4:
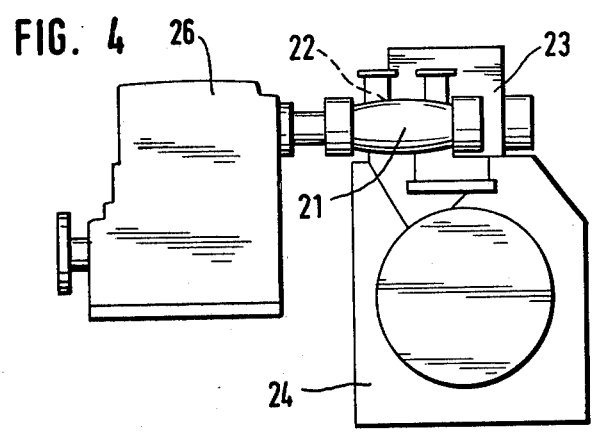
FIG. 4 shows a side view.
Figure 5:
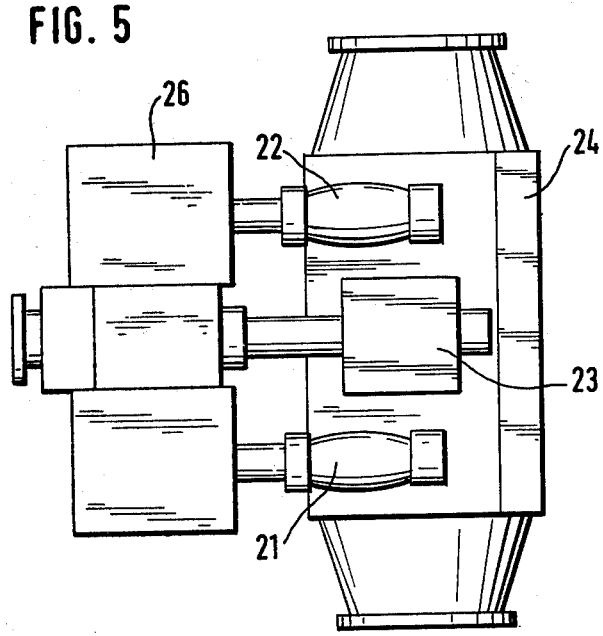
FIG. 5 shows a top view of driving unit and gear assembly in accordance with FIG. 3.

In FIGS. 4 and 5 the high-pressure turbine is denoted by reference numeral 21, the intermediate-pressure turbine with reference numeral 22 and the low-pressure turbine with reference numeral 23. All turbines 21, 22, 23 are connected to the summing gear assembly 26.

As can be seen especially in FIGS. 1f-1i, it is easily possible to shift the intermediate pinions of the second step on the periphery of the greater gear 9 upwardly to such an extent that the stepdown gears of the first step arranged coaxially to the input pinions of the second step are in a position to mesh the third pinion 16 destined for the low-pressure turbine 23 and computed accordingly.

In this manner, so to speak, a gear assembly of the improved "locked train" construction has been obtained. As in the known "locked-train" construction it is ensured that the pinions 1, 2 and 16 of the first step from the high-pressure, intermediate-pressure and low-pressure turbines have a two-fold tooth engagement and that to each pinion of the first step two gears 3 and 10, 4 and 11 and 10 and 11 of the first step are assigned. Accordingly, the input pinions 1, 2 and 16 are not any longer subjected to bending but only to torsional stresses. The gears 10 and 11 of the first step are also not subjected to higher stresses than is the case in the known "locked-train" gear assembly or, respectively, than the gears 3 and 4 of the first step, since the engagement of the pinion 16 of the low-pressure turbine 23 is staggered approximately by 180° relative to the pinions 1 and 2 of the high-pressure turbine 21 and the intermediate-pressure turbine 22. This results in an additional stabilizing effect.

When carrying the above-mentioned example further, the two pinions 1 and 2 belonging to the first step carry 30% and the pinion 16 also belonging to the first step carries approximately 40% of the power. Accordingly, through the shafts 7 and 8 of the two stepdown gears 3 and 4 of the first step, 15% of the power is transmitted to each of the two pinions 5 and 6 of the second step, while approximately 15%+20%=35% of the power can be transmitted to the pinions 12 and 13 of the second step through the shafts 14 and 15.

When a condenser 24 is located below the turbines, the condenser 24 itself can be used as a foundation for the three short turbines 21, 22, 23 or, if necessary, the condenser can be bridged over with a separate foundation. It is possible to arrange the three centers of the axes, i.e. the pinions 1, 2 and 16 of the three partial turbines 21, 22, 23, almost on the same level which significantly facilitates the supervision during operation and the assembly works in case of revisions. In case of ship damage the individual partial turbines can be taken out of operation without difficulties. The entire unit is constructed in a short fashion and represents a complete entirety. Therefore, even if there are two units, i.e. in a twin propeller ship, the two units can be easily accommodated next to one another in a comparatively narrow aftership. This unit allows the best possible efficiency. The total weight of such a proposed unit is lower than the total weight of a unit having the same power but a different design and a different construction of the gear assembly.

I claim:

1. Summing gear assembly for transmitting driving power from a driving machine with separate power outputs, such as a steam turbine unit including a high pressure turbine, an intermediate pressure turbine, and a low pressure turbine, comprising a common power take-off gear, a number of input pinions each connected to a separate power output and a plurality of power drive lines for transmitting the driving power from said input pinions to said power take-off gear, each said power drive line comprising an axially extending shaft, a stepdown gear mounted on said shaft, and an intermediate pinion mounted on said shaft and spaced axially from said stepdown gear thereon, said shafts of said power drive lines disposed in parallel relation and spaced laterally apart about the periphery of said power take-off gear, wherein the improvement comprises n said input pinions, and n+1 said power drive lines, n being a plurality said input pinions having axes extending in parallel with the axes of said power drive lines and the axis of each said input pinion being spaced laterally between the axes of two adjacent said power drive lines with each said input pinion being in meshed engagement with said stepdown gears on the two adjacent said power drive lines and with said intermediate pinions thereon each in meshed engagement with said power take-off gear and n−1 of said stepdown gears being in meshed engagement with two of said input pinions.

2. Summing gear assembly, as set forth in claim 1, wherein said shafts of said power drive lines are constructed as torsion shafts.

3. Summing gear assembly, as set forth in claim 1, wherein n equals three said input pinions and the axes of said input pinions are arranged approximately in a single plane across the top of said power take-off gear.

4. Summing gear assembly, as set forth in claim 1, wherein n equals three said input pinions with one said input pinion positioned between the other two said input pinions and the one said input pinion is staggered by 180° relative to the other two said input pinions.

* * * * *